(12) United States Patent
Kishi et al.

(10) Patent No.: US 7,965,062 B2
(45) Date of Patent: Jun. 21, 2011

(54) METHOD AND APPARATUS FOR CHARGING NONAQUEOUS ELECTROLYTE SECONDARY BATTERY

(75) Inventors: Takashi Kishi, Yokosuka (JP); Takashi Kuboki, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 511 days.

(21) Appl. No.: 12/033,304

(22) Filed: Feb. 19, 2008

(65) Prior Publication Data

US 2008/0231237 A1    Sep. 25, 2008

(30) Foreign Application Priority Data

Feb. 20, 2007   (JP) .................................. 2007-039657

(51) Int. Cl.
*H02J 7/00* (2006.01)
*H02J 7/04* (2006.01)

(52) U.S. Cl. ......... 320/160; 320/124; 320/130; 320/134

(58) Field of Classification Search ............ 320/160, 320/125, 137, 130, 129, 134, 127, 124, 161, 320/162
See application file for complete search history.

(56) References Cited

U.S. PATENT DOCUMENTS

| | | | | |
|---|---|---|---|---|
| 4,746,854 A | * | 5/1988 | Baker et al. | 320/130 |
| 5,550,454 A | * | 8/1996 | Buckley | 320/160 |
| 6,124,700 A | * | 9/2000 | Nagai et al. | 320/132 |
| 7,129,675 B2 | * | 10/2006 | Brecht | 320/137 |
| 7,405,538 B1 | * | 7/2008 | Hoff et al. | 320/150 |
| 7,683,576 B2 | * | 3/2010 | Tien et al. | 320/128 |
| 2002/0145405 A1 | * | 10/2002 | Murakami et al. | 320/130 |
| 2002/0160253 A1 | * | 10/2002 | Vaidyanathan | 429/52 |
| 2006/0068282 A1 | | 3/2006 | Kishi et al. | |
| 2006/0286459 A1 | * | 12/2006 | Zhao et al. | 429/326 |
| 2007/0059587 A1 | | 3/2007 | Kishi et al. | |
| 2007/0172730 A1 | * | 7/2007 | Iwanaga et al. | 429/200 |

FOREIGN PATENT DOCUMENTS

| | | |
|---|---|---|
| JP | 7-143687 | 6/1995 |
| JP | 8-50925 | 2/1996 |
| JP | 10-341540 | 12/1998 |
| JP | 2000-113909 | 4/2000 |
| JP | 2000-236632 | 8/2000 |

* cited by examiner

*Primary Examiner* — Edward Tso
*Assistant Examiner* — Alexis Boateng
(74) *Attorney, Agent, or Firm* — Oblon, Spivak, McClelland, Maier & Neustadt, L.L.P.

(57) ABSTRACT

It is made possible to keep a nonaqueous electrolyte secondary battery in a charged state for a long period of time and minimize the degradation of the battery. A method for charging a nonaqueous electrolyte secondary battery including a cathode, an anode, and a nonaqueous electrolyte, includes: a first charging step of charging the nonaqueous electrolyte secondary battery at a first current value which increases the voltage of the nonaqueous electrolyte secondary battery; and a second charging step of charging the nonaqueous electrolyte secondary battery at a second current value which decreases the voltage of the nonaqueous electrolyte secondary battery. These two charging steps are repeated alternately.

13 Claims, 4 Drawing Sheets

METHOD AND APPARATUS FOR CHARGING NONAQUEOUS ELECTROLYTE SECONDARY BATTERY

CROSS-REFERENCE TO RELATED APPLICATION

This application is based upon and claims the benefit of priority from prior Japanese Patent Application No. 2007-39657 filed on Feb. 20, 2007 in Japan, the entire contents of which are incorporated herein by reference.

BACKGROUND OF THE INVENTION

1. Field of the Invention

The present invention relates to a method for charging a nonaqueous electrolyte secondary battery, which is capable of keeping a nonaqueous electrolyte secondary battery in a charged state for a long period of time, and a charging apparatus for carrying out the charging method.

2. Related Art

Secondary batteries are rechargeable and can be repeatedly used, and therefore can contribute to waste reduction. Such secondary batteries are widely used as power sources of portable electric devices independent of AC power and as backup power sources in case of AC power failure. In recent years, secondary batteries have come to be used in a wider range of applications, and therefore there has been a growing demand for higher-performance secondary batteries having large capacity, excellent temperature characteristics, and high safety.

As such secondary batteries, lead-acid batteries, nickel-cadmium secondary batteries, nickel-hydride secondary batteries, and nonaqueous electrolyte secondary batteries, and the like have been developed and are used throughout the world. Among these secondary batteries, nonaqueous electrolyte secondary batteries are compact and lightweight and have large capacity, and are therefore widely used in not only compact personal computers and mobile phones but also digital cameras and video cameras.

Such a nonaqueous electrolyte secondary battery currently used has a cathode, an anode, and an electrolyte. The cathode can be composed of, for example, a lithium-containing cobalt composite oxide or a lithium-containing nickel composite oxide. The anode can be composed of an anode active material such as a carbon-based material (e.g., a graphite-based material or a coke-based material). The electrolyte can be obtained by dissolving a lithium salt such as $LiPF_6$ or $LiBF_4$ in an organic solvent such as a cyclic carbonate or a chain carbonate. The cathode and anode are formed into a sheet shape, and are impregnated with the electrolyte. Further, between the cathode and the anode, a separator is interposed to electronically insulate the cathode and the anode from each other. These cathode, anode, and separator are housed in a container having any shape.

Nickel-cadmium secondary batteries and nickel-hydride secondary batteries have a reaction path for allowing a charging current externally applied thereto after the end of charging to escape as heat from the system. For this reason, these secondary batteries have overcharge tolerance, and are therefore generally trickle-charged by continuously applying a minute current to them after full charge to keep them full charged.

On the other hand, nonaqueous electrolyte secondary batteries do not have a reaction mechanism for allowing a current causing overcharge to escape as heat from the system, and are therefore more likely to be overcharged and significantly degraded in battery performance as compared to nickel-cadmium secondary batteries and nickel-hydride secondary batteries. In addition, if a large current is continued to be applied to an overcharged nonaqueous electrolyte secondary battery, there is a possibility that safety problems will arise. In order to solve the above problems, various charging methods alternative to trickle charging, such as intermittent charging and constant-voltage charging have been proposed, but they still have problems in that the required amount of charge cannot be continuously ensured and significant degradation of batteries occurs. For example, JP-A 2000-236632 (KOKAI) discloses a method for minimizing the degradation of a nickel-hydride battery by controlling the time interval between charges and a charging current during intermittent charging of the battery.

However, when a nonaqueous electrolyte secondary battery is charged with a constant current easily obtained during main charging (i.e., during charging carried out with a first level of charging current and charging carried out with a second level of charging current in the charging method disclosed in JP-A 2000-236632 (KOKAI)), there is a possibility that a battery voltage becomes too high, thereby degrading the battery and impairing heat stability of the battery. Further, when a nonaqueous electrolyte secondary battery is charged in a rest period by constant-voltage charging disclosed in JP-A 2000-236632 (KOKAI), the battery is kept at a predetermined high voltage for a long period of time, thereby causing a problem that battery characteristics are significantly deteriorated.

In addition, a nonaqueous electrolyte secondary battery generally uses an electrolyte mainly containing an organic solvent, and therefore as in the case of a nickel-hydride battery using an aqueous solution, there is a danger that the battery will expand or explode as a result of an increase in the vapor pressure of the organic solvent or vaporization of the organic solvent caused by temperature rise. Further, the organic solvent such as a carbonate is flammable, and therefore if a liquid or gas containing the organic solvent leaks from the battery, there is a danger of ignition or explosion.

In order to solve the above problems, use of an ionic liquid having no flash point as an electrolyte has been studied to significantly improve safety of nonaqueous electrolyte secondary batteries. By using such an ionic liquid as an electrolyte, it is possible to obtain a battery which can operate in a high temperature environment where even a battery using an aqueous solution as an electrolyte cannot operate as well as to overcome the problem of conventional nonaqueous electrolyte secondary batteries, such as ignition of leaked electrolyte.

The performance degradation of nonaqueous electrolyte secondary batteries does not occur in the case of cyclic charging and discharging usually carried out. However, in a case where nonaqueous electrolyte secondary batteries are charged by constant-voltage charging at high temperature, there is a problem that significant performance degradation occurs. Further, in a case where nonaqueous electrolyte secondary batteries are charged at high temperature by trickle charging usually used to charge nickel-cadmium secondary batteries and nickel-hydride secondary batteries, more significant performance degradation occurs. For this reason, trickle charging cannot be practically used to charge nonaqueous electrolyte secondary batteries.

SUMMARY OF THE INVENTION

The present invention has been made in view of these circumstances, and an object thereof is to provide a method for charging a nonaqueous electrolyte secondary battery, which is capable of keeping a nonaqueous electrolyte secondary battery in a charged state for a long period of time while minimizing the degradation of the battery, and a charging apparatus for carrying out the charging method.

According to a first aspect of the present invention, there is provided with a method for charging a nonaqueous electrolyte secondary battery including a cathode, an anode, and a nonaqueous electrolyte, including: a first charging step of charging the nonaqueous electrolyte secondary battery at a first current value which increases the voltage of the nonaqueous electrolyte secondary battery; and a second charging step of charging the nonaqueous electrolyte secondary battery at a second current value which decreases the voltage of the nonaqueous electrolyte secondary battery, wherein these two charging steps are repeated alternately.

According to a second aspect of the present invention, there is provided with an apparatus for charging a nonaqueous electrolyte secondary battery including a cathode, an anode, and a nonaqueous electrolyte, including: a first charge control unit configured to charge the nonaqueous electrolyte secondary battery at a first current value which increases the voltage of the nonaqueous electrolyte secondary battery and then output a first stop signal at the end of charging; and a second charge control unit configured to operate based on the first stop signal to charge the nonaqueous electrolyte secondary battery at a second current value which decreases the voltage of the nonaqueous electrolyte secondary battery and then output a second stop signal at the end of charging, wherein the first charge control unit initiates charging operation based on an external start command signal or the second stop signal.

DESCRIPTION OF THE EMBODIMENTS

Figure 2:
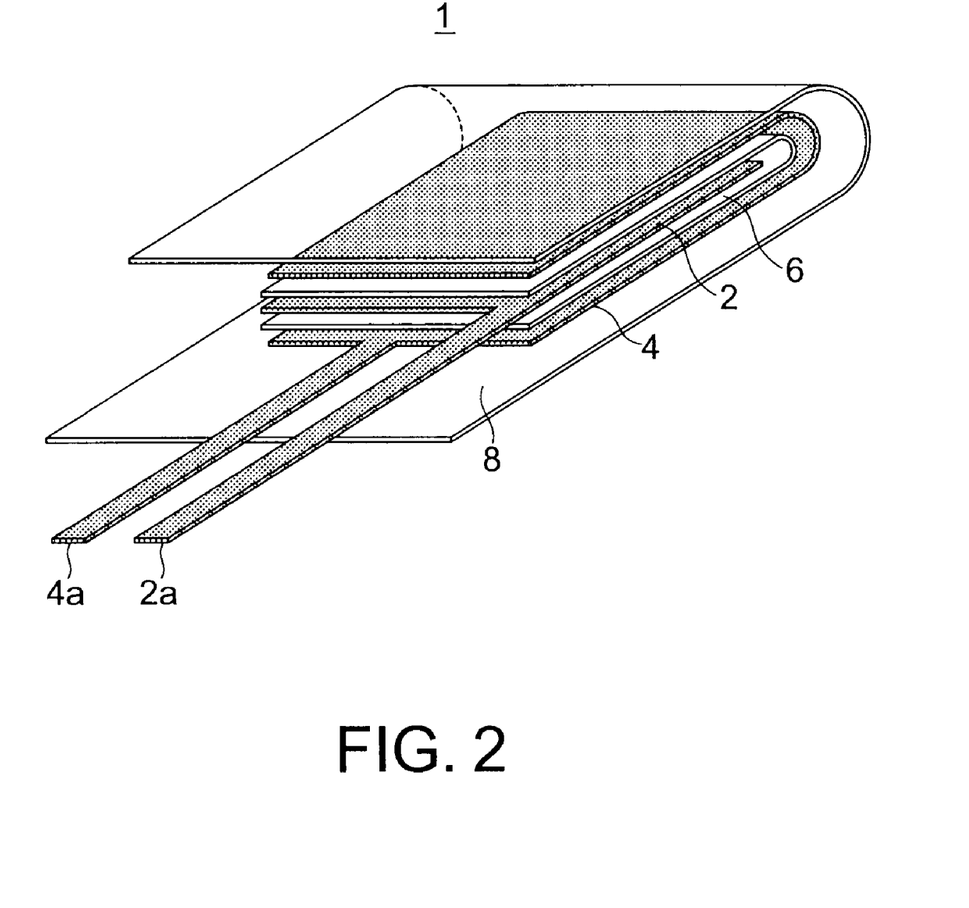
FIG. 2 is a perspective view showing one example of a laminate-type nonaqueous electrolyte secondary battery for use in the charging method according to the embodiment.

Prior to a description of a method for charging a nonaqueous electrolyte secondary battery according to an embodiment of the present invention, a nonaqueous electrolyte secondary battery for use in the charging method according to the present embodiment will be described. One example of the nonaqueous electrolyte secondary battery is shown in FIG. 2. As shown in FIG. 2, a nonaqueous electrolyte secondary battery 1 is a laminate-type battery, but may have any external shape such as a coin shape, a cylindrical shape, or a rectangular parallelepiped shape because the charging method according to the present embodiment can be applied to any nonaqueous electrolyte secondary battery irrespective of its external shape.

The nonaqueous electrolyte secondary battery 1 includes a sheet-shaped cathode 2, a sheet-shaped anode 4 folded to interpose the cathode 2 between the folds thereof, a sheet-shaped separator 6 folded and interposed between the sheet-shaped cathode 2 and the sheet-shaped anode 4, and a non-aqueous electrolyte (not shown) held by the cathode 2, anode 4, and separator 6. The cathode 2, anode 4, and separator 6 are hermetically sealed in a laminate bag 8 obtained by folding a laminate and heat-sealing the three sides of the laminate. The cathode 2 has a cathode terminal 2a for providing electrical connection to the outside, and the anode 4 has an anode terminal 4a for providing electrical connection to the outside. The cathode terminal 2a and the anode terminal 4a are exposed to the outside of the laminate bag 8.

It is to be noted that the cathode 2 contains a cathode active material, and may further contain an electronically conductive material such as carbon and a binder for allowing the cathode 2 to have a sheet shape or a pellet shape. Further, the cathode 2 may be used together with a current collector attached thereto and containing an electronically conductive metal or the like as a base material. Examples of the binder include polytetrafluoroethylene (PTFE), polyvinylidene fluoride (PVdF), ethylene-propylene-diene copolymer, and styrene-butadiene rubber. Examples of the current collector include foils, thin plates, meshes, and woven wire meshes made of metals such as aluminum, stainless steel, and titanium. The pellet- or sheet-shaped cathode 2 can be obtained by adding a binder to a cathode active material and a conductive material and kneading or rolling a resultant mixture. Alternatively, the sheet-shaped cathode 2 may also be obtained by dissolving and suspending a cathode active material, a conductive material, and a binder in a solvent such as toluene or N-methylpyrrolidone (NMP) to obtain a slurry, applying the slurry onto a current collector, and drying the slurry.

The anode 4 contains an anode active material, and is obtained by forming a mixture of an anode active material, a conductive material, a binder, etc. into a pellet shape, a thin plate shape, or a sheet shape. Examples of the conductive material for use in the anode 4 include electronically conductive materials such as carbon and metals, and such a conductive material is preferably in the form of powder, fibrous powder, or the like. Examples of the binder for use in the anode 4 include polytetrafluoroethylene (PTFE), polyvinylidene fluoride (PVdF), styrene-butadiene rubber, and carboxymethyl cellulose (CMC). Examples of a current collector for the anode 4 include foils, thin plates, meshes, woven wire meshes made of metals such as copper, stainless steel, and nickel. The pellet- or sheet-shaped anode 4 can be obtained by adding a binder to an anode active material and a conductive material and kneading or rolling a resultant mixture. Alternatively, the sheet-shaped anode 4 may also be obtained by dissolving and suspending an anode active material, a conductive material, and a binder in a solvent such as water or N-methylpyrrolidone (NMP) to obtain a slurry, applying the slurry onto a current collector, and drying the slurry.

Examples of the separator 6 include synthetic resin non-woven fabrics, polyethylene porous films, polypropylene porous films, and cellulose non-woven fabrics.

As the laminate bag 8, an aluminum laminate obtained by providing two heat-sealable polymer layers on both sides of an aluminum foil is used. Alternatively, a laminate using another metal or a laminate having only one polymer layer may also be used. Alternatively, a container having any shape such as a cylindrical shape, a rectangular parallelepiped shape, or a coin shape may also be used.

Figure 1:
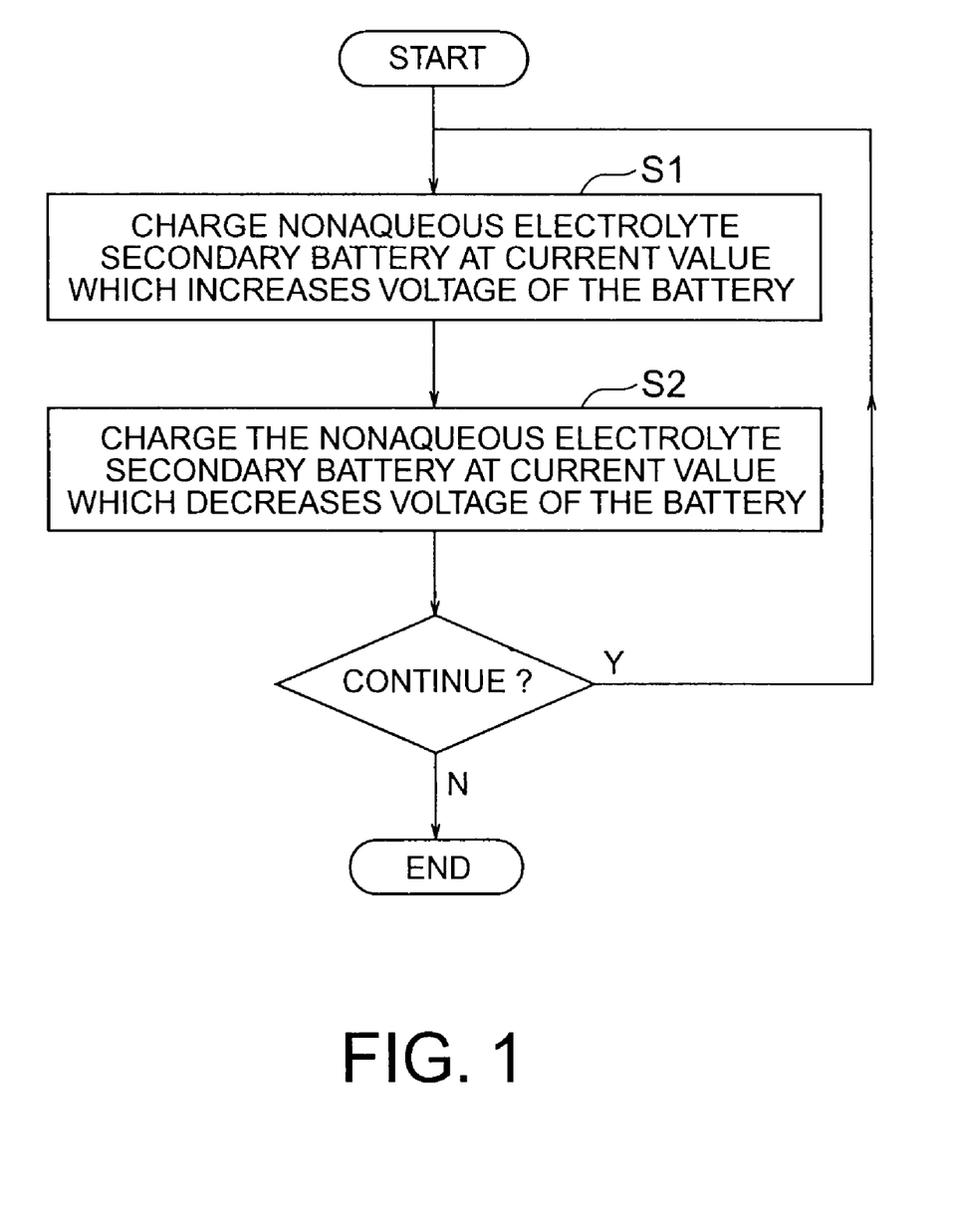
FIG. 1 is a flow chart showing a charging method according to an embodiment of the present invention.

Hereinbelow, the charging method according to the present embodiment will be described with reference to FIGS. 1 and 3. FIG. 1 is a flow chart showing the charging method according to the present embodiment and FIG. 3 is a block diagram showing a charging apparatus for carrying out the charging method according to the present embodiment.

The charging method according to the present embodiment is carried out by alternately repeating a first charging step (a step shown in FIG. 1 as "S1") and a second charging step (a step shown in FIG. 1 as "S2"). As shown in FIG. 1, the first charging step is the step of charging the nonaqueous electrolyte secondary battery 1 at a current value which increases the voltage of the nonaqueous electrolyte secondary battery 1, and the second charging step is the step of charging the nonaqueous electrolyte secondary battery 1 at a current value which decreases the voltage of the nonaqueous electrolyte secondary battery 1.

Figure 3:
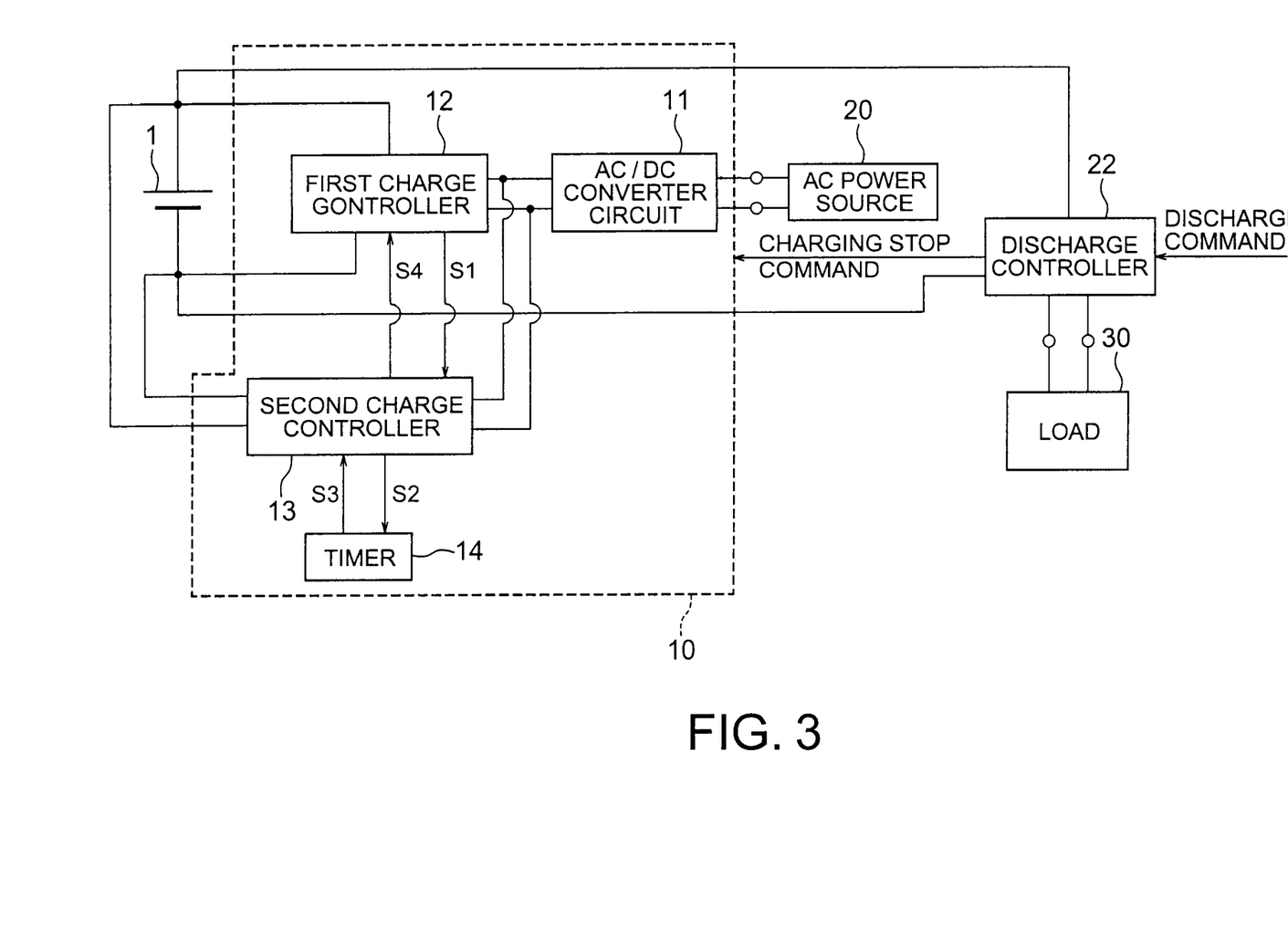
FIG. 3 is a block diagram showing one example of a charging apparatus for carrying out the charging method according to the embodiment.

The first and second charging steps are carried out by a charging system shown in FIG. 3. The charging apparatus includes a charge circuit 10, an AC power source 20, and a discharge controller 22.

The charge circuit 10 includes an AC/DC converter circuit 11 for converting an alternating current supplied from the AC power source 20 into a direct current, a first charge controller 12, a second charge controller 13, and a timer 14. The first charge controller 12 receives a direct current supplied from the AC/DC converter circuit 11 and operates to carry out the first charging step. The second charge controller 13 receives a direct current supplied from the AC/DC converter circuit 11 and operates to carry out the second charging step. When receiving a discharging command from the outside, the discharge controller 22 transmits a charging stop command to the charge circuit 10 to stop the charging operation of the charge circuit 10, electrically connects the nonaqueous electrolyte secondary battery 1 to a load 30, and performs various control operations for discharging, such as current control and discharging stop control by voltage monitoring.

It is to be noted that in the first charging step, the nonaqueous electrolyte secondary battery 1 may be charged by constant-voltage charging or constant-current followed by constant-voltage charging. The first charging step is carried out for fully charging the nonaqueous electrolyte secondary battery 1 or for charging the nonaqueous electrolyte secondary battery 1 until the nonaqueous electrolyte secondary battery 1 becomes able to supply a current equal to or larger than that required by the load 30. Therefore, the first charging step is carried out by constant-voltage charging or constant-current followed by constant-voltage charging used for charging from full discharge, pulse charging, or constant-power charging. Among them, constant-voltage charging and constant-current followed by constant-voltage charging are excellent because they are suited for stably raising the level of the amount of charge stored in the nonaqueous electrolyte secondary battery 1 to a certain level or higher. Particularly, constant-current followed by constant-voltage charging is preferred because the nonaqueous electrolyte secondary battery 1 can be fully charged while a load on the nonaqueous electrolyte secondary battery 1 can be minimized.

The object of the first charging step can be achieved by charging the nonaqueous electrolyte secondary battery 1 at a current value which increases the voltage of the nonaqueous electrolyte secondary battery 1. In this regard, it is preferred that a large current is applied to the nonaqueous electrolyte secondary battery 1 to increase the amount of charge stored in the nonaqueous electrolyte secondary battery 1 in a short period of time. The specific current value depends on the purpose of use of the nonaqueous electrolyte secondary battery 1 and the kind of charging apparatus used. When the value of a current that discharges the capacity of a fully-charged target battery in one hour is defined as 1 C, a maximum current value is preferably 0.1 C or more because the first charging step can be completed in about 10 hours and therefore the battery 1 is less likely to be adversely affected by a power failure or the like. It is to be noted that the capacity of a fully-charged battery is determined by a nominal capacity indicated by the manufacturer of the battery. More preferably, a maximum current value is 0.5 C or more to complete the first charging step in about 2 hours, but is 5 C or less to suppress an increase in battery temperature due to heat generation during charging. The first charging step can be terminated, for example, when a predetermined time for the operation of the first charging step has passed or when a current flowing between the battery 1 and the first charge controller 12 has reached a predetermined value. Particularly, in a case where the first charging step is carried out by constant-current followed by constant-voltage charging, the first charging step is preferably terminated when a current flowing between the battery 1 and the first charge controller 12 has converged to a predetermined value. By carrying out the first charging step under the above conditions, it is possible to complete charging in a short period of time while minimizing the voltage magnitude applied across the cathode and the anode.

It is to be noted that when the operation of the first charging step is terminated, the first charge controller 12 transmits a command signal S1 to the second charge controller 13 (see FIG. 3). As a result, the second charge controller 13 initiates the operation of the second charging step.

The second charging step is the step of charging the nonaqueous electrolyte secondary battery 1 at a current value which decreases the voltage of the nonaqueous electrolyte secondary battery 1. Unlike trickle charging such that a constant current is applied to a battery to maintain or increase the voltage of the battery, the second charging step is carried out with a minute current corresponding to a self-discharge amount or less. The minute current does not need to be a constant current, and can be gradually increased or decreased. However, the minute current is preferably a constant current because a constant current can be most easily obtained at low cost.

The second charging step is terminated when a predetermined time for the operation of the second charging step has passed or when the voltage of the battery 1 has reached a predetermined value, and is then switched to the first charging step. From the viewpoint of achieving a simple charging system, the second charging step is preferably terminated when a predetermined time has passed. In this case, the time when the second charging step is switched to the first charging step can be predicted, and therefore there is an advantage that it is easy to ensure a stable supply of electric power required for the first charging step. The time when the second charging step is switched to the first charging step is controlled by the timer 14 shown in FIG. 3. More specifically, when the second charge controller 13 operates to initiate the second charging step, a start command S2 is transmitted to the timer 14, and then the timer 14 starts to operate. Then, when a predetermined time has passed, the timer 14 transmits a command signal S3 to the second charge controller 13 to terminate the operation of the second charging step. In a case where charging is to be continued, the second charge controller 13 transmits a command signal S4 to the first charge controller 12 to initiate the operation of the first charging step (see FIG. 3). In this way, the first and second charging steps are repeated.

On the other hand, the method of terminating the second charging step based on whether a predetermined voltage is reached is suited for compensating for self-discharge so that the amount of electricity or electric power stored in the battery 1 can be always kept at a certain level or higher. Particularly, even in a case where it is predicted that an environmental change such as a temperature change will occur, or even in a case where ambient temperature is increased so that a self-discharge rate is increased, the voltage of the battery 1 can be monitored and therefore the first charging step can be carried out before a self-discharge amount exceeds a certain level to additionally charge the battery. For this reason, this method is suited for continuously compensating for self-discharge to keep the amount of electricity stored in the battery 1 at a certain level or higher. In this case, however, it is necessary to replace the timer 14 shown in FIG. 3 with a monitoring circuit for monitoring the voltage of the battery 1 in the charge system.

Unlike trickle charging, the second charging step makes it possible to suppress a reduction in the amount of charge stored in the nonaqueous electrolyte secondary battery caused by self-discharge while minimizing the characteristic degradation of the battery 1, and therefore the battery 1 can continuously store the required amount of charge without producing an overcharge state. In addition, since the second charging step makes it possible to apply a minute current to the battery 1 to continuously compensate for self-discharge, it is possible to make the time interval from charging by the first charging step to the next charging by the first charging step longer as compared to the case of intermittent charging. In addition, the second charging step also makes it possible to suppress the characteristic degradation of the battery 1 because a maximum charging voltage can be lowered while the required amount of charge can be continuously stored in the battery 1. According to the charging method of the present embodiment, it is possible to prevent a maximum voltage from being always applied across the terminals of the nonaqueous electrolyte secondary battery 1, and therefore the characteristic degradation of the battery 1 can be further suppressed as compared to constant-voltage charging such that a high voltage is always applied to the battery 1.

As described above, in the second charging step, the battery 1 is charged with a current which decreases the voltage of the battery 1. In this regard, the value of a current applied to the battery 1 in the second charging step is required to be smaller than that applied to the battery 1 just before the end of the first charging step. If the value of a current applied to the battery 1 in the second charging step is larger than that applied to the battery 1 just before the end of the first charging step, the voltage of the battery 1 becomes high just after the first charging step is switched to the second charging step. As a result, the voltage of the battery 1 exceeds a constant voltage value set in the first charging step, thereby causing degradation of the battery 1. Further, if the voltage of the battery 1 becomes significantly high just after the first charging step is switched to the second charging step, there is a possibility that the thermal stability of the battery 1 is impaired.

Further, the value of a current applied to the nonaqueous electrolyte secondary battery 1 in the second charging step is also required not to exceed the self-discharge rate of the battery 1. The nonaqueous electrolyte secondary battery 1 self-discharges at a relatively high rate just after the end of the first charging step, but the self-discharge rate of the battery 1 is gradually lowered and then becomes substantially constant after a certain period of time has passed. Even after a certain period of time has passed from the end of the first charging step, the value of a current applied to the battery 1 in the second charging step is required not to exceed the self-discharge rate of the battery 1 until the second charging step is switched to the subsequent first charging step, and is therefore preferably 0.001 C or less. Particularly, in a case where the second charging step is carried out for 10 days or longer, the value of a current applied to the battery 1 in the second charging step is preferably 0.0005 C or less. However, if the value of a current applied to the battery 1 in the second charging step is too small, the current is difficult to control and therefore an expensive control device becomes necessary. For this reason, the value of a current applied to the battery 1 in the second charging step is preferably 0.00001 C or higher. In a case where a constant current is applied to the battery 1 in the second charging step, the value of the constant current is preferably 0.0001 C or higher but 0.0004 C or less to avoid the risk of shifting to overcharge for a long period of time as well as to compensate for self-discharge. In a high temperature environment of 60° C. or higher, the reactivity between the electrolyte and the electrodes, especially the reactivity between the electrolyte and the cathode active material is enhanced, and therefore the effects obtained by the second charging step become more conspicuous.

As the nonaqueous electrolyte of the nonaqueous electrolyte secondary battery 1 for use in the present embodiment, a non-electronically conductive liquid which does not react with the cathode and the anode during charging and discharging but can transport lithium ions is used. Examples of such a liquid include: cyclic carbonates such as ethylene carbonate and propylene carbonate; lactones such as γ-butyrolactone; chain carbonates such as diethyl carbonate; and ionic liquids containing imidazolium cations or piperidinium cations. The nonaqueous electrolyte of the nonaqueous electrolyte secondary battery 1 can be obtained by dissolving a lithium salt in one of these liquids or a mixture of two or more of these liquids. In a case where the battery 1 is to be used in an environment having a temperature of 60° C. or lower, cyclic carbonates, chain carbonates, and lactones are preferred to obtain excellent rate characteristics, charge and discharge cycle characteristics, and pulse discharge characteristics. On the other hand, in a case where the battery 1 is to be used in an environment having a maximum temperature exceeding 60° C., ionic liquids are preferred to prevent ignition as well as volatilization of a solvent component. Particularly, in a case where the battery 1 is to be used in an environment having a temperature of 100° C. or higher, ionic liquids are preferred to suppress an increase in the inner pressure of a battery cell.

By using an ionic liquid electrolyte obtained by dissolving a lithium salt in an ionic liquid, it is possible to obtain a nonaqueous electrolyte secondary battery which can stably operate and be stored at high temperature. However, when such a nonaqueous electrolyte secondary battery is used at a high temperature of 60° C. or higher, a self-discharge rate as well as a chemical reaction rate is increased. At the same time, since the electrochemical window of an ionic liquid is narrower than that of an organic solvent such as a carbonate, keeping the battery at high potential and application of excessive voltage have greater effects on degradation of the battery. Therefore, when the battery is kept in a charged state by intermittent charging at a high temperature of 60° C. or higher, the time interval between charges is short so that the battery is significantly degraded. Likewise, trickle charging is not preferred because the duration of time that the battery is being kept at high potential directly affects the degree of characteristic degradation of the battery. As described above, when a nonaqueous electrolyte secondary battery using an ionic liquid electrolyte is used at high temperature, the self-discharge rate of the battery is increased and degradation of the battery is accelerated by keeping the battery at high potential. For these reasons, the degree of difficulty in keeping the nonaqueous electrolyte secondary battery 1 in a charged state for a long period of time is very high.

However, by keeping the nonaqueous electrolyte secondary battery 1 using an ionic liquid electrolyte in a charged state by the charging method according to the present embodiment in which the first charging step and the second charging step are repeated, it is possible to continuously store the required amount of charge in the battery 1 even in a high temperature environment while minimizing the degradation of the battery 1. Particularly, in a high temperature environment of 60° C. or higher, a charging current applied to the battery 1 in the second charging step is preferably 0.0001 C or more but 0.001 C or less to compensate for accelerated self-discharge.

In a case where the second charging step is terminated when a predetermined time has passed, the predetermined time is preferably 3 days or longer but 6 months or shorter to avoid frequent charging carried out by the first charging step causing a temporary increase in charge-side power consumption as well as to suppress the degradation of battery characteristics. More preferably, the predetermined time is 7 days or longer but 30 days or shorter because it is possible to easily predict and control the date when the first charging step consuming a larger amount of electric power will be carried out.

On the other hand, in a case where the second charging step is terminated when a predetermined voltage has been reached, the predetermined voltage of the second charging step is preferably 0.1 V to 0.5 V lower than the maximum voltage of the first charging step. By setting the predetermined voltage of the second charging step to a value within the above range, it is possible to ensure the required amount of charge even at the end of the second charging step when the amount of electricity remaining in the battery 1 is the lowest as well as to minimize a maximum charging voltage throughout the first and second charging steps to suppress the degradation of battery characteristics.

The cathode 2 of the nonaqueous electrolyte secondary battery 1 for use in the present embodiment contains as a cathode active material, a lithium composite oxide which contains at least one of cobalt, manganese, and nickel and which can occlude and release alkali metal ions such as lithium and sodium and alkaline earth metal ions such as calcium. In order to obtain a large battery capacity, the cathode active material is preferably a metal oxide which can occlude and release lithium ions having a small weight per charge, and examples of such a metal oxide usable as a cathode active material include chalcogen compounds such as a lithium-containing cobalt composite oxide, a lithium-containing nickel cobalt composite oxide, a lithium-containing nickel composite oxide, and a lithium manganese composite oxide. Among them, oxides whose charge-discharge potential is 3.8 V or more higher than a lithium metal potential are preferred to achieve a large battery capacity, and examples thereof include a lithium-containing cobalt composite oxide, a lithium-containing nickel cobalt composite oxide, and a lithium-containing manganese composite oxide. Particularly, a cathode compound represented by the formula: $LiCo_xNi_yMn_zO_2$ ($x+y+z=1$, $0<x\leq0.5$, $0\leq y<1$, $0\leq z\leq1$) is preferred because the decomposition reaction of an ionic liquid on the surface of the cathode can be suppressed at a high temperature of 60° C. or higher.

Similarly to the cathode, the anode 4 of the nonaqueous electrolyte secondary battery 1 for use in the present embodiment preferably contains an anode active material which can occlude and release alkali metal ions such as lithium and sodium and alkaline earth metal ions such as calcium and which can occlude and release the same kind of metal ions that the cathode occludes and releases at a baser potential than the cathode used in combination with the anode. In order to obtain a large battery capacity, the anode preferably contains an anode active material which can occlude and release lithium ions. Examples of an anode active material having such properties include lithium metal, carbonaceous materials such as artificial and natural graphite, non-graphitizable carbon, and easily graphitizable carbon sintered at low temperature, lithium titanate, iron sulfide, cobalt oxide, lithium aluminum alloy, and tin oxide. More preferred examples of the anode active material include those enabling the anode 4 to have an operating potential nobler than the potential of metal lithium by 0.5 V or more. By selecting such an anode active material, it is possible to suppress the degradation of the battery 1 caused by side reaction of an ionic liquid on the surface of the anode active material. From these viewpoints, lithium titanate and iron sulfide are most preferred as the anode active material. It is to be noted that the above-mentioned anode active materials can be used in combination of two or more of them. The anode active material can have any shape such as a scale-like shape, a fibrous shape, or a spherical shape.

In a case where an ionic liquid electrolyte is used as an electrolyte of the nonaqueous electrolyte secondary battery 1 for use in the charging method according to the present embodiment, the ionic liquid electrolyte contains an ionic liquid and an alkali metal salt or alkaline earth metal salt. Such an ionic liquid is in a molten state at about room temperature to allow the battery 1 to operate at normal temperature. Examples of a cation constituting the ionic liquid include, but are not limited to, aromatic quaternary ammonium-based ions such as 1-ethyl-3-methyl imidazolium, 1-methyl-3-propyl imidazolium, 1-methyl-3-isopropyl imidazolium, 1-butyl-3-methyl imidazolium, 1-ethyl-2,3-dimethyl imidazolium, 1-ethyl-3,4-dimethyl imidazolium, N-propyl pyridinium, N-butyl pyridinium, N-tert-butyl pyridinium, and N-tert-pentyl pyridinium; and aliphatic quaternary ammonium-based ions such as N-butyl-N,N,N-trimethyl ammonium, N-ethyl-N,N-dimethyl-N-propyl ammonium, N-butyl-N-ethyl-N,N-dimethyl ammonium, N-butyl-N,N-dimethyl-N-propyl ammonium, N-methyl-N-propyl pyrrolidinium ion, N-butyl-N-methylpyrrolidinium ion, N-methyl-N-pentyl pyrrolidinium, N-propoxy ethyl-N-methyl pyrrolidinium, N-methyl-N-propyl piperidinium, N-methyl-N-isopropyl piperidinium, N-butyl-N-methyl piperidinium, N-isobutyl-N-methyl piperidinium, N-sec-butyl-N-methyl piperidinium, N-methoxy ethyl-N-methyl piperidinium, and N-ethoxy ethyl-N-methyl piperidinium. These cations may be used singly or in combination of two or more of them. Among these aliphatic quaternary ammonium-based ions, nitrogen-containing five-membered ring pyrrolidinium-based ions and nitrogen-containing six-membered ring piperidinium-based ions are preferred because they have high resistance to reduction and therefore a side reaction can be suppressed and the battery 1 can have improved storage properties and cycle performance.

Among these aromatic quaternary ammonium-based ions, cations having an imidazolium structure are more preferred because a low-viscosity ionic liquid can be obtained and a battery having high output characteristics can be obtained when such a low-viscosity ionic liquid is used as an electrolyte. Further, when an anode active material which allows the anode to have an potential voltage nobler than the potential of metal lithium by 0.5 V or more is used, a side reaction on the anode can be suppressed even when an ionic liquid containing a cation having an imidazolium structure is used, and therefore a nonaqueous electrolyte secondary battery excellent in storage properties and cycle performance can be obtained.

Examples of an anion constituting the ionic liquid include, but are not limited to, a tetrafluoroboric acid anion ($BF_4^-$), a hexafluorophosphoric acid anion ($PF_6^-$), a hexafluoromethylsulfonic acid anion, a bistrifluoromethylsulfonylamide anion (TFSI), a bispentafluoroethylsulfonylamide (BETI), and a dicyanamide anion (DCA). These anions may be used singly or in combination of two or more of them. In a case where the battery 1 is to be used in a high temperature environment of 60° C. or higher, bispentafluoroethylsulfonylamide is preferred because it has high resistance to high temperature.

Examples of the alkali metal salt include lithium salts and sodium salts, and examples of the alkaline earth metal salts include calcium salts. In order to obtain a large battery capacity, lithium salts are preferred. Specific examples of the lithium salts include lithium tetrafluoroborate ($LiBF_4$), lithium hexafluorophosphate ($LiPF_6$), lithium hexafluoromethylsulfonate, lithium bistrifluoromethylsulfonylamide (LiTFSI), lithium bispentafluoroethylsulfonylamide (LiBETI), and lithium dicyanamide (LiDCI). These lithium salts may be used singly or in combination of two or more of them. From the viewpoint of improving the characteristics of the battery 1 in a relatively high temperature environment of, for example, 60° C., the alkali metal salt preferably has the same anion species as the ionic liquid.

The concentration of the alkali metal salt or alkaline earth metal salt is preferably in the range of 0.1 to 2.5 mol/L. If the concentration of the salt is lower than 0.1 mol/L, sufficient ion conductivity cannot be obtained so that a discharge capacity is lowered. On the other hand, if the concentration of the salt exceeds 2.5 mol/L, the viscosity of the ionic liquid is significantly increased so that it becomes difficult to impregnate the cathode and anode active materials with the ionic liquid. Also in this case, a discharge capacity is lowered. From the viewpoints of the viscosity of the ionic liquid at about room temperature and maximizing the absolute number of ions, the concentration of the salt is more preferably in the range of 0.5 to 2.3 mol/L.

The ionic liquid electrolyte is composed of one or more of the ionic liquids mentioned above and one or more of the alkali metal salts mentioned above. In order to maximize flame retardancy, it is preferred that the ionic liquid electrolyte contains no organic solvent other than them. However, the ionic liquid electrolyte may contain another organic solvent to enhance the effect of suppressing a side reaction in the battery 1 or its affinity for the separator etc. The amount of another organic solvent to be added to the ionic liquid electrolyte is preferably 5 wt % or less to keep the flame retardancy of the ionic liquid electrolyte. In a case where another organic solvent is added to control a chemical reaction such as a side reaction in the battery 1, it is preferred that half or more of the amount of another organic solvent added is consumed after fabricating the battery 1 or after the completion of initial charging and discharging. Therefore, in this case, the amount of another organic solvent to be added is preferably 3 wt % or less or the number of moles corresponding to a first cycle irreversible capacity increased by the addition of another organic solvent.

As shown in FIG. 3, the cathode terminal 2a and the anode terminal 4a of the nonaqueous electrolyte secondary battery 1 for use in the charging method according to the present embodiment are connected to a charge circuit and a discharge circuit. The connection can be established by various methods such as fixed connection (e.g., connection by welding) and connection through mechanical contact of the terminals accommodated in a battery box.

The charging apparatus to be used for carrying out the charging method according to the present embodiment can alternately repeat the first charging step and the second charging step, and may include a safety protection device such as a circuit for disconnecting a charge circuit to prevent overcharge and temperature increase, a charge circuit for carrying out another charging method after full discharge, a circuit for integrating the amount of current, or the like. The charging apparatus may be combined with a nonaqueous electrolyte secondary battery to provide a battery pack, or may be separated from a nonaqueous electrolyte secondary battery and incorporated into a load-side device.

EXAMPLE

Hereinbelow, an example of the present invention will be described. It is to be noted that in the following example, the battery 1 shown in FIG. 2 was used.

90 wt % of a lithium cobalt oxide ($Li_2CoO_2$) powder, 2 wt % of acetylene black, 3 wt % of graphite, and 5 wt % of polyvinylidene fluoride as a binder were dissolved and suspended in N-methylpyrrolidone as a solvent to obtain a slurry, and the slurry was applied onto one surface of an aluminum foil having a thickness of 20 μm. After the slurry on the aluminum foil was dried, the slurry was applied also onto the other surface of the aluminum foil. After the slurry on the other surface of the aluminum foil was dried, the thus obtained aluminum foil was rolled to obtain a cathode sheet. A piece of 30 mm×30 mm was cut out from the cathode sheet, and then an aluminum ribbon having a width of 5 mm and a length of 50 mm was connected by welding to the piece of the cathode sheet to obtain a cathode 2.

90 wt % of a $Li_{4/3}Ti_{5/3}O_4$ powder as an anode active material, 5 wt % of artificial graphite as a conductive material, and 5 wt % of polyvinylidene fluoride (PVdF) were added to an N-methylpyrrolidone (NMP) solution, and then they were mixed to obtain a slurry. The thus obtained slurry was applied onto an aluminum foil having a thickness of 20 μm, and was then dried and rolled to obtain an anode sheet. A piece having a width of 30 mm and a length of 60 mm was cut out from the anode sheet, and then an aluminum ribbon having a width of 5 mm and a length of 50 mm was connected by welding to the piece of the anode sheet to obtain an anode 4.

A polypropylene non-woven fabric was used as a separator 6.

Then, 0.75 mol/L lithium bispentafluoroethylsulfonylamide (LiBETI) was dissolved in 1-ethyl-3-methylimidazolium bispentafluoroethylsulfonylamide (EMI•BETI) to prepare a nonaqueous electrolyte. An aluminum laminate 8 was folded in two, and only two sides thereof were heat-sealed to form an aluminum laminate bag having an opening at one side thereof.

Then, the separator 6 was folded in two, and the cathode 2 was interposed between the folds of the separator 6. Further, the anode 4 was folded in two, and the cathode 2 and the separator 6 were interposed between the folds of the anode 4, and the thus obtained laminated structure was placed in the aluminum laminate bag. The nonaqueous electrolyte was poured into the aluminum laminate bag to vacuum impregnate the cathode, anode, and separator with the nonaqueous electrolyte. Then, the opening of the aluminum laminate bag was closed by heat-sealing to obtain a laminate-type nonaqueous electrolyte secondary battery 1.

A standard maximum charging voltage was set at 2.7 V. A charge and discharge test was carried out at 80° C. Charging was carried out by constant-current and constant-voltage charging (CCCV charging) at 0.2 mA, and was terminated when 0.3 mA had been reached in the constant-voltage charging period or when a total charging time had reached 7 hours. Discharging was carried out at 0.2 mA until 1.5 V was reached. The discharge capacity of the battery 1 was in the range of 10 to 11 mAh, and therefore the standard capacity of the battery 1 was defined as 10 mAh to calculate a C rate.

Three batteries 1 prepared in the above manner were subjected to a long-term test at a high temperature of 80° C. in the following manner. It is to be noted that the discharge capacity of the battery 1 measured for the last time was defined as a reference capacity of the battery 1 before the long-term test.

Example 1

A first charging step was carried out by constant-current followed by constant-voltage charging at a constant current of 0.3 mA (0.03 C) and a constant voltage of 2.7 V until 0.03 mA was reached. It is to be noted that initial charging from full discharge was carried out by constant-current followed by constant-voltage charging at a constant current of 2 mA (0.2 C) and a constant voltage of 2.7 V until 0.3 mA was reached.

Figure 4:
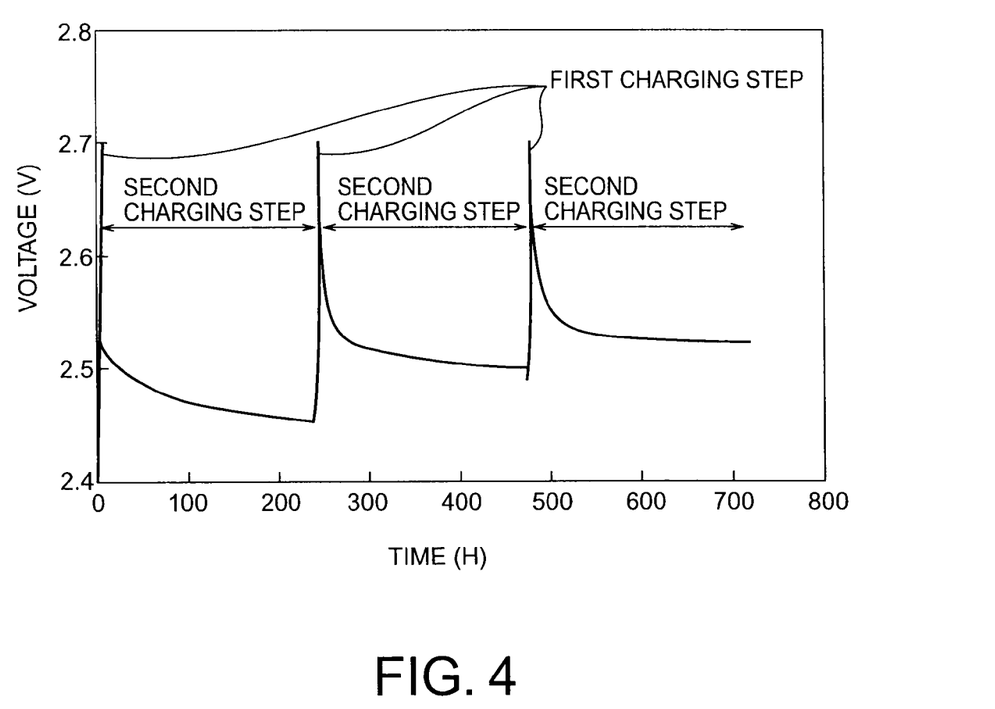
FIG. 4 is a voltage profile during charging carried out by the charging method according to the embodiment.

A second charging step was carried out with a minute current of 0.003 mA (0.0003 C) for a limited time of 10 days (240H). A series of the first and second charging steps was repeated three times, and the long-term test was completed at the time when the third round of the second charging step had been terminated. Then, a discharge test was carried out in the same manner as in the discharge test carried out before the long-term test to measure a battery capacity at the time of the end of the long-term test. It is to be noted that charging and discharging were always carried out in a thermostatic chamber maintained at 80° C. The voltage profile of the battery 1 obtained during the long-term test is shown in FIG. 4. As can be seen from FIG. 4, the voltage of the battery 1 was continuously decreased during the second charging step.

Comparative Example 1

The battery 1 was charged by constant-current followed by constant-voltage charging at a constant current of 2 mA (0.2 C) and a constant voltage of 2.7 V until 0.3 mA was reached, and was then stored on open circuit for 30 days at 80° C. Thereafter, a battery capacity at the time of the end of the long-term test was measured in the same manner as in the Example 1. It is to be noted that charging, discharging, and storage were always carried out in a thermostatic chamber maintained at 80° C.

Comparative Example 2

The battery was charged by constant-current followed by constant-voltage charging at a constant current of 2 mA (0.2 C) and a constant voltage of 2.7 V until 0.3 mA was reached, and was then stored on open circuit for 10 days, and was then charged by constant-current charging at 0.3 mA (0.03 C) until 2.7 V was reached. Then, a series of storage on open circuit for 10 days and constant-current charging at 0.3 mA was repeated twice. In this way, a long-term test was carried out for 30 days in total. Thereafter, a battery capacity at the time of the end of the long-term test was measured in the same manner as in the Example 1. It is to be noted that charging, discharging, and storage were always carried out in a thermostatic chamber maintained at 80° C.

The thus measured battery capacities before and after the long-term test and capacity ratios calculated from the battery capacities before and after the long-term test are shown in the following table.

| | Reference capacity measured before long-term test | Capacity measured after long-term test | Residual capacity ratio (%) |
|---|---|---|---|
| Example 1 | 10.781 | 9.041 | 83.9 |
| Comparative Example 1 | 10.743 | 5.642 | 52.5 |
| Comparative Example 2 | 10.510 | 7.746 | 73.7 |

As can be seen from the table, the charging method of the Example 1 can suppress battery capacity reduction and achieve a higher residual capacity ratio than the charging methods of the Comparative Examples 1 and 2 even after 30-day storage in a high temperature environment of 80° C.

As has been described above, according to the present embodiment, it is possible to keep a nonaqueous electrolyte secondary battery in a charged state for a long period of time while suppressing the degradation of the nonaqueous electrolyte secondary battery.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concepts as defined by the appended claims and their equivalents.

What is claimed is:

1. A method for charging a nonaqueous electrolyte secondary battery comprising a cathode, an anode, and a nonaqueous electrolyte, comprising:
    a first charging step of charging the nonaqueous electrolyte secondary battery at a first current value which increases the voltage of the nonaqueous electrolyte secondary battery; and
    a second charging step of charging the nonaqueous electrolyte secondary battery at a second current value which decreases the voltage of the nonaqueous electrolyte secondary battery and is less than a self-discharge rate, wherein these two charging steps are repeated alternately.

2. The method according to claim 1, wherein the first charging step is carried out by constant-voltage charging or constant-current followed by constant-voltage charging, and the second charging step is carried out at a constant current value which is equal to or lower than the value of a charging current applied just before the end of the first charging step.

3. The method according to claim 1, wherein the second charging step is carried out with a charging current having the second current value of 0.001 C or less but 0.00001 C or higher, and the second charging step is terminated when a predetermined time has passed or when a predetermined voltage has been reached, and is then switched to the first charging step.

4. The method according to claim 1, wherein the nonaqueous electrolyte contains an ionic liquid.

5. The method according to claim 1, wherein the nonaqueous electrolyte secondary battery is charged at 60° C. or higher, and the second charging step is carried out at a current value of 0.001 C or less.

6. The method according to claim 1, wherein the cathode contains as a cathode active material, a compound represented by $LiCo_xNi_yMn_zO_2$ ($x+y+z=1$, $0<x \leqq 0.5$, $0 \leqq y<1$, $0 \leqq z<1$).

7. The method according to claim 1, wherein the anode contains a lithium titanate as an anode active material.

8. An apparatus for charging a nonaqueous electrolyte secondary battery comprising a cathode, an anode, and a nonaqueous electrolyte, comprising:
 a first charge control unit configured to charge the nonaqueous electrolyte secondary battery at a first current value which increases the voltage of the nonaqueous electrolyte secondary battery and then output a first stop signal at the end of charging; and
 a second charge control unit configured to operate based on the first stop signal to charge the nonaqueous electrolyte secondary battery at a second current value which decreases the voltage of the nonaqueous electrolyte secondary battery and is less than a self-discharge rate, and then output a second stop signal at the end of charging, wherein the first charge control unit initiates charging operation based on an external start command signal or the second stop signal.

9. The apparatus according to claim 8, wherein the first charge control unit terminates the charging operation when a predetermined time has passed from initiating of the charging operation or when a current flowing between the nonaqueous electrolyte secondary battery and the first charge control unit has reached a predetermined value.

10. The apparatus according to claim 8, wherein the second charging control unit terminates the charging operation when a predetermined time has passed from initiating of the charging operation or when a voltage of the nonaqueous electrolyte secondary battery has reached a predetermined value.

11. The apparatus according to claim 8, wherein the nonaqueous electrolyte contains an ionic liquid.

12. The apparatus according to claim 8, wherein the cathode contains as a cathode active material, a compound represented by $LiCo_xNi_yMn_zO_2$ ($x+y+z=1$, $0<x\leq0.5$, $0\leq y<1$, $0\leq z<1$).

13. The apparatus according to claim 8, wherein the anode contains a lithium titanate as an anode active material.

* * * * *